US012580328B2

(12) United States Patent
Bonucci et al.

(10) Patent No.: US 12,580,328 B2
(45) Date of Patent: Mar. 17, 2026

(54) POWER CONNECTOR SYSTEM WITH LEVER FOR TIGHTENING A CONNECTING BOLT

(71) Applicant: TE CONNECTIVITY BRASIL INDUSTRIA DE ELECTRONICOS LTDA, Braganca Paulista (BR)

(72) Inventors: Gustavo Bonucci, Campinas (BR); Rafael Kazuo Sato T. Leme, Braganca Paulista (BR); Natanael Marcondes dos Santos, Braganca Paulista (BR); Denilson Serafim, Braganca Paulista (BR); Djalma Oliveira, Braganca Paulista (BR)

(73) Assignee: TE Connectivity Solutions GmbH (CH)

( * ) Notice: Subject to any disclaimer, the term of this patent is extended or adjusted under 35 U.S.C. 154(b) by 295 days.

(21) Appl. No.: 18/358,192

(22) Filed: Jul. 25, 2023

(65) Prior Publication Data

US 2025/0038432 A1 Jan. 30, 2025

(51) Int. Cl.

| | |
|---|---|
| ***H01R 4/30*** | (2006.01) |
| ***H01R 13/193*** | (2006.01) |
| ***H01R 13/40*** | (2006.01) |
| ***H01R 13/621*** | (2006.01) |
| ***H01R 13/629*** | (2006.01) |
| *H01R 4/28* | (2006.01) |
| *H01R 13/62* | (2006.01) |
| *H01R 13/639* | (2006.01) |

(52) U.S. Cl.

CPC ........... *H01R 4/305* (2013.01); *H01R 13/193* (2013.01); *H01R 13/40* (2013.01); *H01R 13/621* (2013.01); *H01R 13/62933* (2013.01); *H01R 4/28* (2013.01); *H01R 4/30* (2013.01); *H01R 4/304* (2013.01); *H01R 4/308* (2013.01); *H01R 13/62* (2013.01); *H01R 13/629* (2013.01); *H01R 13/639* (2013.01); *H01R 2201/26* (2013.01)

(58) Field of Classification Search

CPC ...... H01R 4/305; H01R 13/193; H01R 13/40; H01R 13/621; H01R 13/62933; H01R 4/28; H01R 4/30; H01R 4/304; H01R 4/308; H01R 13/62; H01R 13/629; H01R 13/639; H01R 2201/26

See application file for complete search history.

(56) References Cited

U.S. PATENT DOCUMENTS

2011/0250771 A1* 10/2011 Suzuki ............. H01R 13/62933 439/157

* cited by examiner

*Primary Examiner* — Justin M Kratt

(57) ABSTRACT

A power connector system includes a plug connector including a plug housing holding a plug terminal terminated to an end of a power cable. The power cable exits the plug housing at a cable exit. The plug connector includes a lever rotatably coupled to the plug housing. The power connector system includes a header connector including a header housing holding a header terminal configured to be received in the plug housing to mate with the plug terminal when the plug connector is mated with the header connector. The header connector includes a connecting bolt coupled to the header terminal. The header terminal is pressed into the plug terminal when the connecting bolt is tightened. The lever is actuated to tighten the connecting bolt.

19 Claims, 10 Drawing Sheets

POWER CONNECTOR SYSTEM WITH LEVER FOR TIGHTENING A CONNECTING BOLT

BACKGROUND OF THE INVENTION

The subject matter herein relates generally to electrical connectors.

Electrical connectors typically include a housing holding terminals that are configured to be mated with another electrical connector. For example, the electrical connectors may include a header connector mounted to an electrical component and a plug connector configured to be coupled to the header connector. The housings of the electrical connectors are typically provided with cavities extending therethrough for receiving the terminals. The electrical connectors need to maintain a reliable electrical connection at the interface between the terminals. For example, the electrical connectors may be subject to vibration during use. Some known electrical connectors use deflectable mating elements, such as spring beams, to maintain an electrical connection. However, spring beams may have a limited amount of current carrying capability because the spring beams may be relatively thin to allow the spring beams to be deflectable. Additionally, the terminals may be expensive to manufacture and assemble. The terminals may occupy a large amount of space.

A need remains for an electrical connector system having a reliable electrical connection.

BRIEF DESCRIPTION OF THE INVENTION

In one embodiment, power connector system is provided and includes a plug connector including a plug housing holding a plug terminal. The plug housing includes a mating opening at a mating end. The plug terminal has a mating end aligned with the mating opening. The plug terminal has a terminating end terminated to an end of a power cable. The power cable exits the plug housing at a cable exit. The plug connector includes a lever rotatably coupled to the plug housing. The power connector system includes a header connector including a header housing holding a header terminal. The header terminal is received in the mating opening to mate with the plug terminal when the plug connector is mated with the header connector. The header connector includes a connecting bolt coupled to the header terminal. The header terminal is pressed into the plug terminal when the connecting bolt is tightened. The lever is actuated to tighten the connecting bolt.

In another embodiment, a power connector system is provided and includes a plug housing having a cavity extending between a mating end and a cable end. The plug housing has a mating opening at the mating end configured to receive a portion of a header housing when mated thereto. The power connector system includes a plug terminal received in the cavity. The plug terminal has a terminating end. The plug terminal has a mating end aligned with the mating opening. The plug terminal includes a mating surface configured to be mated with a header terminal. The mating end includes a bolt hole configured to receive a connecting bolt of the header housing. The power connector system includes a power cable coupled to the terminating end of the plug terminal. The power cable exits the plug housing at the cable end. The power connector system includes a lever rotatably coupled to the plug housing and movable between an unlocked position and a locked position. The lever includes a drive tool configured to engage the connecting bolt to drive the connecting bolt when the lever is rotated. The plug terminal is uncoupled from the header terminal when the lever is in the unlocked position and wherein the plug terminal is coupled to the header terminal when the lever is in the locked position.

In a further embodiment, a power connector system is provided and includes a header housing having a base and a shroud extending from the base. The shroud surrounds a cavity. The shroud is configured to be plugged into a mating opening of a plug housing of a plug connector. The base includes a mounting flange configured to be mounted to a component. The power connector system includes a header terminal received in the cavity. The header terminal has a mating end that includes a mating surface configured to be mated with a plug terminal. The header terminal includes a threaded bore at the mating end. The power connector system includes a connecting bolt threadably coupled to the header terminal at the threaded bore. The connecting bolt includes a head configured to engage a locking lever of the plug connector. The head is configured to be rotated relative to the header terminal as the locking lever is moved from an unlocked position to the locked position. The header terminal is moved relative to the head when the head is rotated to couple the header terminal to the plug terminal when the head is rotated.

DETAILED DESCRIPTION OF THE INVENTION

Figure 1:
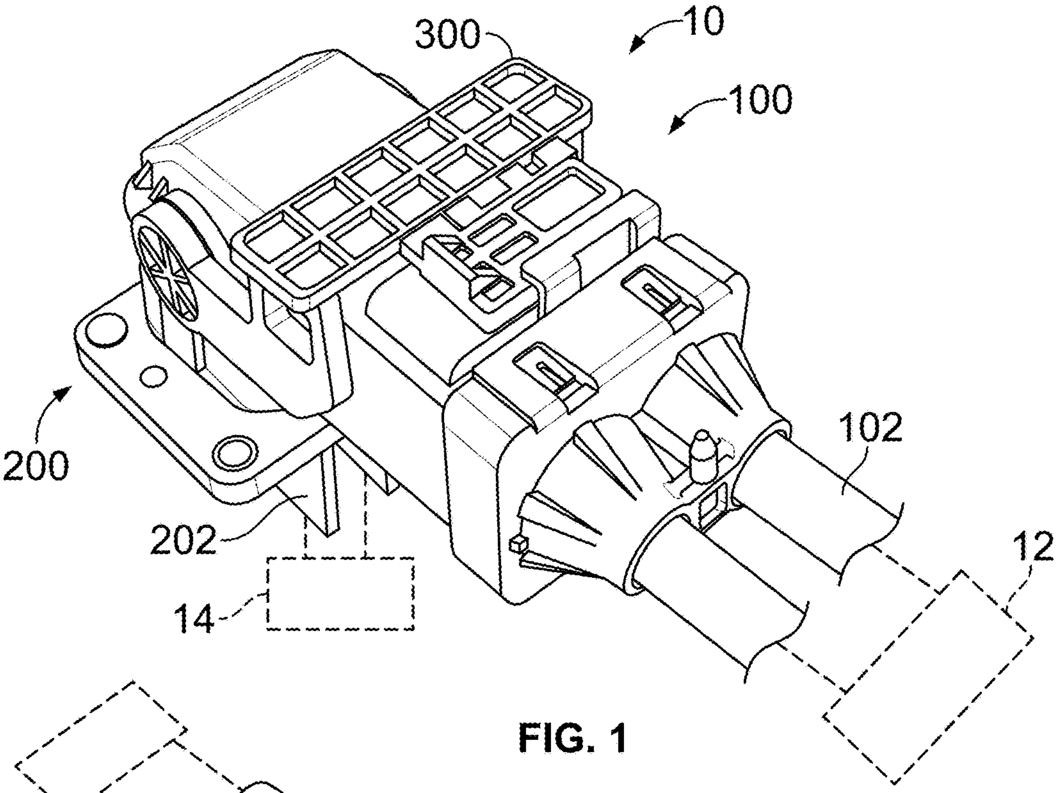
FIG. 1 is a rear perspective view of a power connector system in accordance with an exemplary embodiment in an assembled and mated state.
Figure 2:
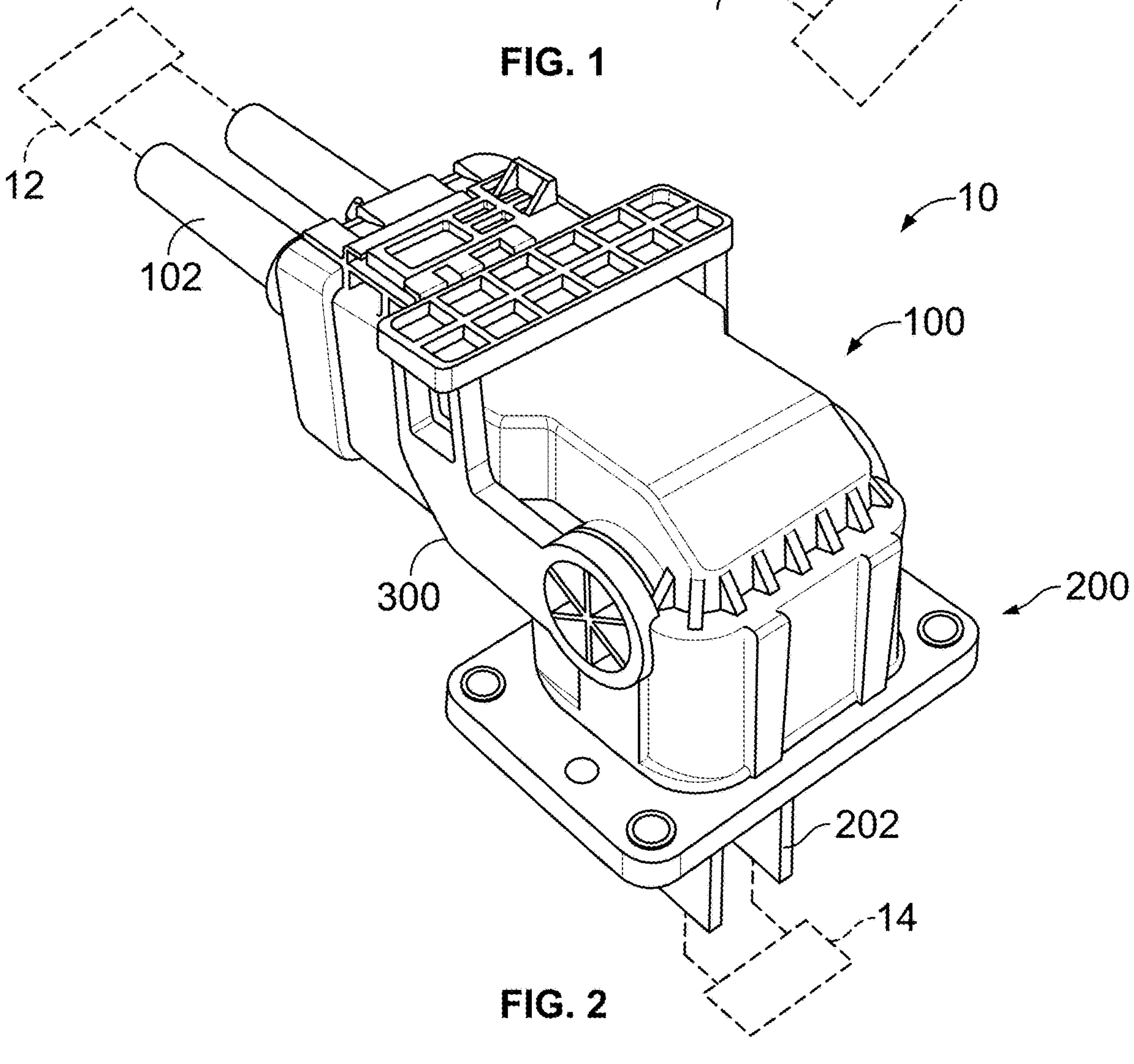
FIG. 2 is a front perspective view of the power connector system in an assembled and mated state in accordance with an exemplary embodiment.

FIG. 1 is a rear perspective view of a power connector system 10 in accordance with an exemplary embodiment in an assembled and mated state. FIG. 2 is a front perspective view of the power connector system 10 in an assembled and mated state. The power connector system 10 includes a header connector 200 and a plug connector 100 configured to be mated with the header connector 200. In an exemplary embodiment, the power connector system 10 is a high-power connector system that is used to transfer power between various components as part of a high power circuit. In a particular application, the power connector system 10 is a battery system, such as a battery system of a vehicle, such as an electric vehicle or hybrid electric vehicle; however, the power connector system 10 is not intended to be limited to such battery systems.

The plug connector 100 is configured to be electrically connected to a component 12, such as through one or more power cables 102; however, the plug connector 100 may be electrically connected to the component 12 by other means, such as a terminal, a bus bar or other connector. In various embodiments, the component 12 may be a battery, a charger, an inverter, an electric motor or another type of component. The header connector 200 is configured to be electrically connected to a component 14, such as through one or more power bus bars 202; however, the header connector 200 may be electrically connected to the component 14 by other means, such as a terminal, power cable or other connector. In an exemplary embodiment, the header connector 200 is configured to be mounted directly to the component 14, such as using fasteners. In various embodiments, the header connector 200 may be electrically connected to a battery pack, such as through a battery distribution unit, a manual service disconnect, a charger, an inverter, an electric motor, or another type of component. The battery distribution unit may manage the power capacity and functionality of the power connector system 10, such as by measuring current and regulating power distribution of the battery pack.

In the illustrated embodiment, the power connector system 10 is a right angle connector system where the connectors 100, 200 are mated in a direction perpendicular to the power cables 102. In various embodiments, the mating direction may be a vertical mating direction where the plug connector 100 is plugged onto the header connector 200 from above. Other mating orientations are possible in alternative embodiments. In other embodiments, the power cables 102 may be oriented in other orientations relative to the mating direction, such as parallel to the mating direction rather than perpendicular to the mating direction.

In an exemplary embodiment, the plug connector 100 is removably coupled to the header connector 200 to disconnect the high power circuit of one or more of the components, such as the battery pack, the electric motor, the inverter, or other components of the vehicle, such as for maintenance, repair or for another reason. When mated, one or more header terminals 210 (FIG. 6) of the header connector 200 are mated with corresponding plug terminals 110 (FIG. 5) of the plug connector 100, such as at mating interfaces thereof. In an exemplary embodiment, the header terminals 210 are mated to the plug terminals 110 by a bolted connection. For example, the header terminals 210 are mated to the plug terminals 110 at a compression interface, such as at side surfaces of the header terminals 210 and the plug terminals 110. In various embodiments, the connectors 100, 200 include pairs of the plug terminals 110 and the header terminals 210, respectively. However, greater or fewer terminals may be utilized in alternative embodiments. Having multiple terminals increases the current carrying capacity of the system 10. In an exemplary embodiment, the header connector 200 and/or the plug connector 100 may include a high voltage interlock (HVIL) circuit to control the high voltage power circuit during opening and closing or mating and unmating of the connectors 100, 200.

In an exemplary embodiment, the plug connector 100 utilizes a lever 300 to secure the connectors 100, 200 in a mated state. The lever 300 may be used to lock the plug connector 100 to the header connector 200. In various embodiments, the lever 300 may be used as a mate assist device, such as to aide in mating and unmating the connectors 100, 200. In an exemplary embodiment, the lever 300 is used to create a bolted connection between the header terminals 210 and the plug terminals 110. For example, the lever 300 is used to rotate or tighten connecting bolts 400 (FIG. 6) when the lever is actuated, which tightens or presses the header terminals 210 and the plug terminals 110 together to maintain a reliable electrical connection that can withstand vibration or other environmental issues. In an exemplary embodiment, the connectors 100, 200 are finger proof and touch-safe.

Figure 3:
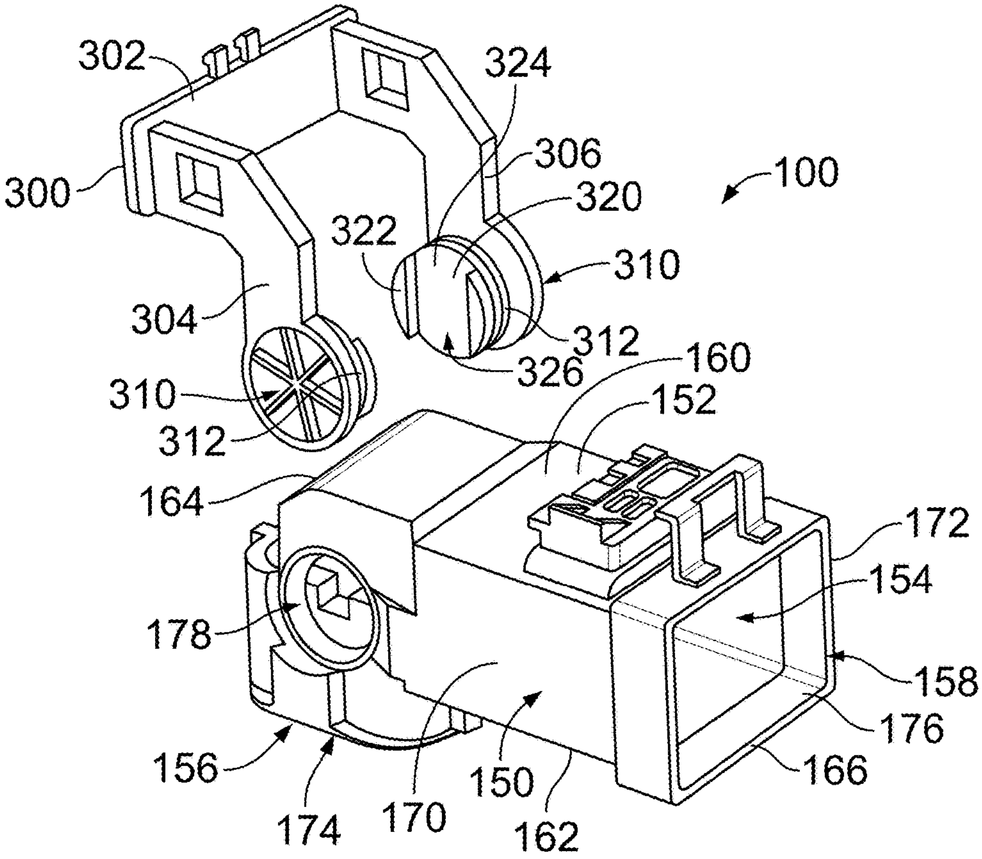
FIG. 3 is an exploded view of a portion of the plug connector in accordance with an exemplary embodiment.
Figure 4:
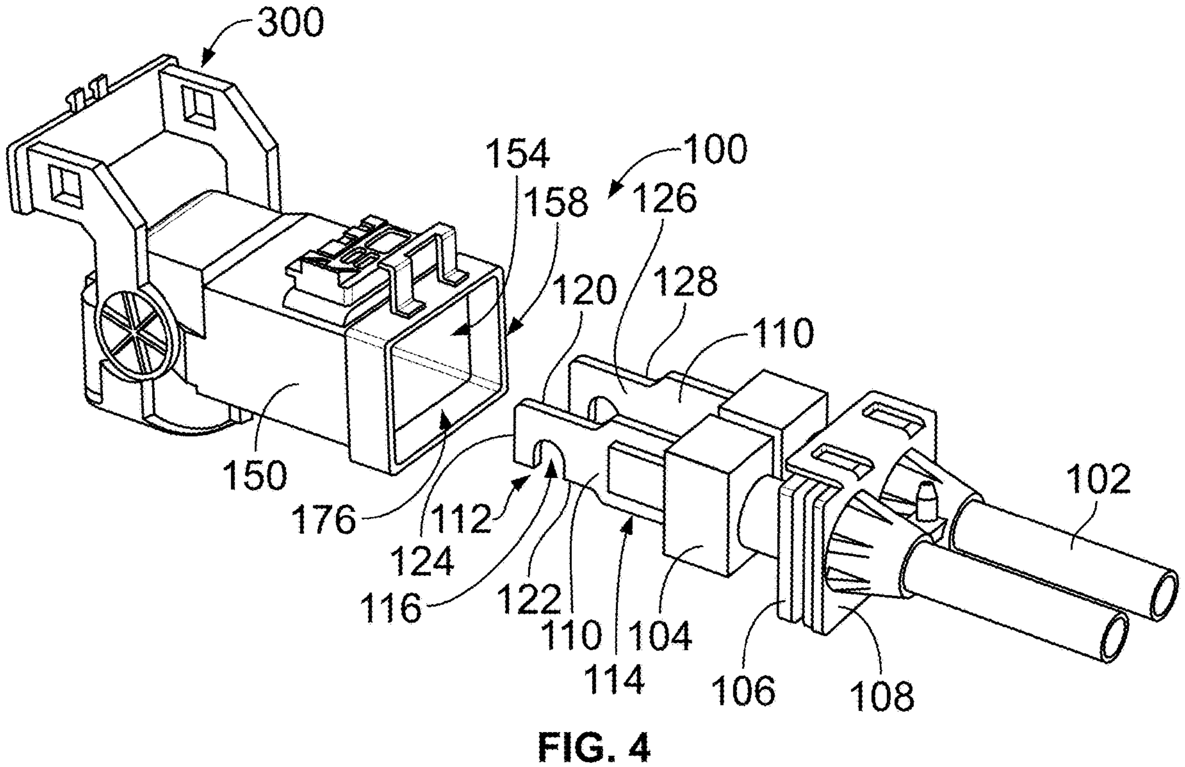
FIG. 4 is an exploded view of a portion of the plug connector in accordance with an exemplary embodiment.

FIG. 3 is an exploded view of a portion of the plug connector 100 in accordance with an exemplary embodiment. The plug connector 100 includes a plug housing 150 configured to hold the plug terminals 110 (FIG. 4). The lever 300 is configured to be coupled to the plug housing 150. For example, the lever 300 is configured to be rotatably coupled to the plug housing 150. In an exemplary embodiment, a latch 308 is coupled to the plug housing 150 to secure the lever 300 to the plug housing 150, such as in a locked position.

Figure 5:
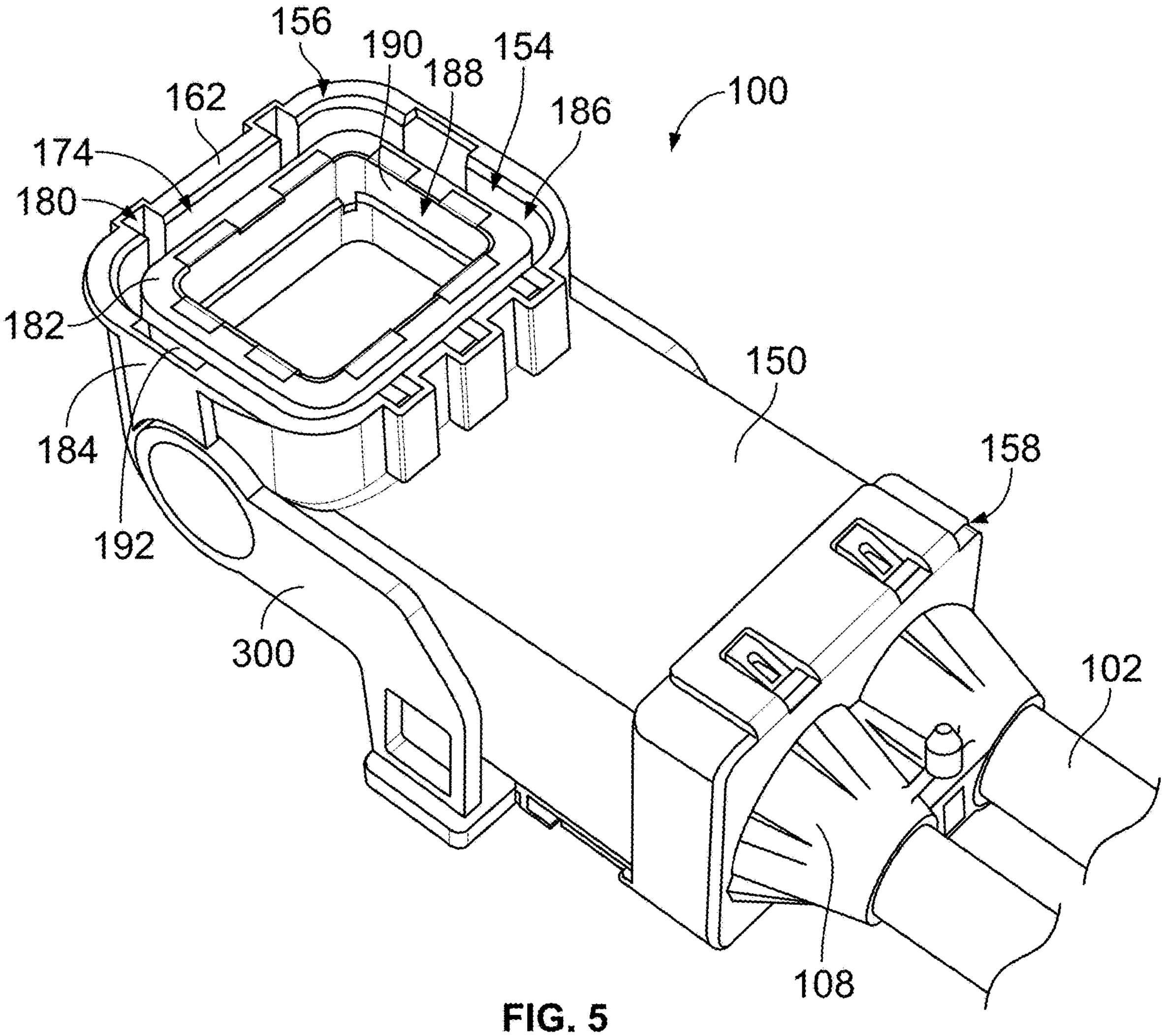
FIG. 5 is a bottom perspective view of the plug connector in accordance with an exemplary embodiment.
Figure 6:
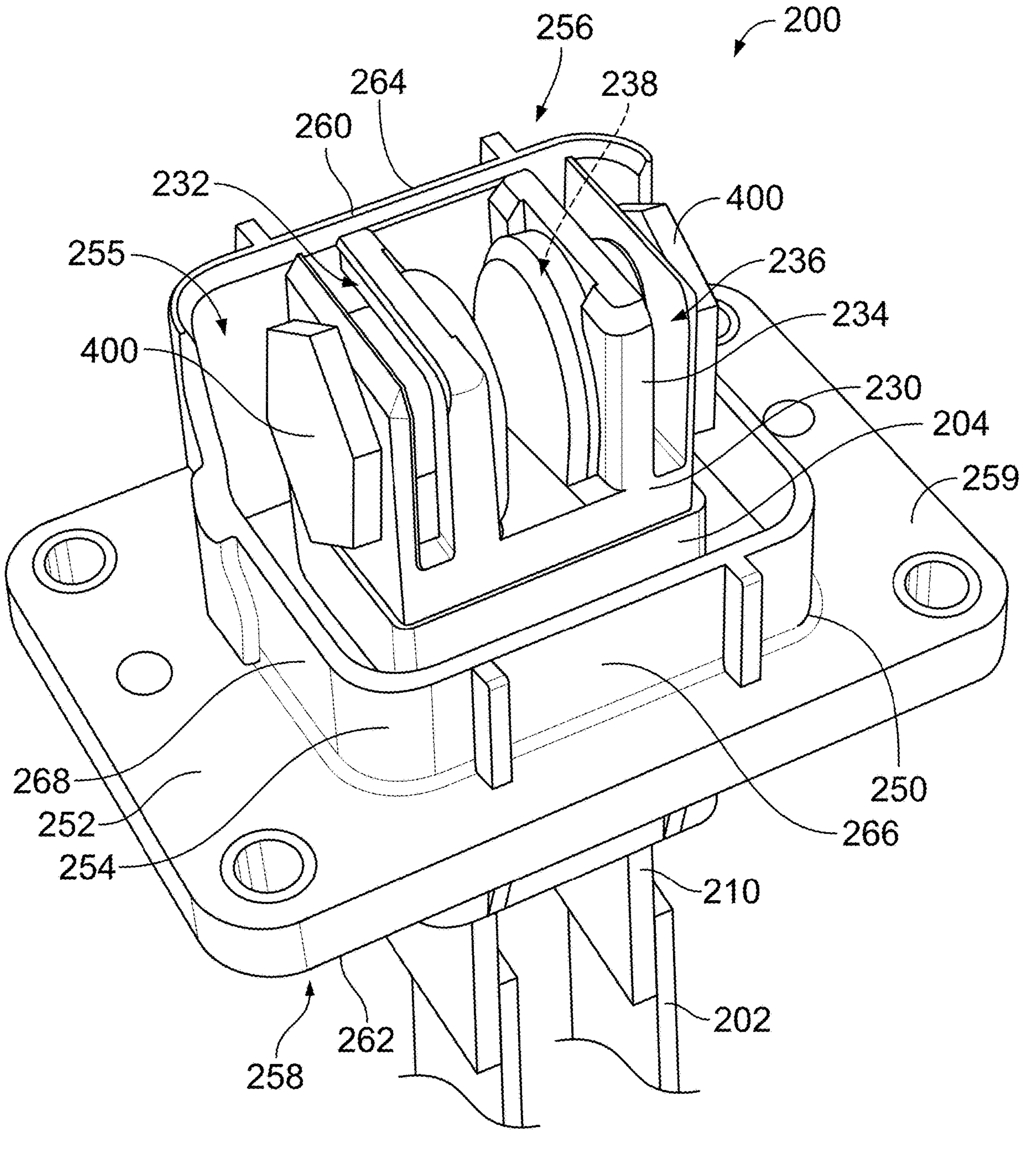
FIG. 6 is a top perspective view of the header connector in accordance with an exemplary embodiment.

The plug housing 150 includes walls 152 forming a cavity 154. The plug terminals 110 are configured to be located within the cavity 154. The plug housing 150 includes a mating end 156 configured to be mated to the header connector 200 (FIG. 6). The plug housing 150 includes a cable end 158. The power cables 102 (FIG. 5) extend from the plug housing 150 at the cable end 158. In an exemplary embodiment, the plug connector 100 is a right angle connector having the cable end 158 perpendicular to the mating end 156. For example, the power cables 102 extend perpendicular to a mating direction. In the illustrated embodiment, the mating direction is a vertical or downward direction, or as the power cables 102 extend horizontally from the plug housing 150.

In an exemplary embodiment, the plug housing 150 includes a top 160 and a bottom 162. The plug housing 150 extends between a front 164 and a rear 166. The plug housing 150 includes sides 170, 172 extending between the front 164 and the rear 166. In an exemplary embodiment, the lever 300 is coupled to the plug housing 150 at the first side 170 and/or the second side 172. In an exemplary embodiment, the bottom 162 defines the mating end 156. The bottom 162 of the plug housing 150 is configured to be pluggable be coupled to the header connector 200. In an exemplary embodiment, the plug housing 150 includes an opening 174 at the bottom 162. The opening 174 is configured to receive a portion of the header connector 200. The mating end 156 may be located at other portions of the plug housing 150 in alternative embodiments, such as the front 164. In an exemplary embodiment, the rear 166 defines the cable end 158. The plug housing 150 includes an opening 176 at the rear 166. The power cables 102 are configured to exit the plug housing 150 through the opening 176. The cable end 158 may be located at other portions of the plug housing 150 in alternative embodiments, such as the top 160.

In an exemplary embodiment, the plug housing 150 includes lever openings 178 at the sides 170, 172. The lever openings 178 are configured to receive portions of the lever 300. In the illustrated embodiment, the lever openings 178 are circular allowing the lever 300 to be rotated within the lever openings 178.

The lever 300 includes a handle 302. The handle 302 is used to actuate the lever 300, such as to move the lever 300 relative to the plug housing 150 when coupled thereto. The lever 300 includes a first lever arm 304 and a second lever arm 306 extending from opposite sides of the handle 302. The lever arms 304, 306 are configured to extend along the sides 170, 172 of the plug housing 150.

In an exemplary embodiment, the lever 300 includes hubs 310 at distal ends of the lever arms 304, 306. The hubs 310 are configured to be received in corresponding lever openings 178 of the plug housing 150. In various embodiments, the hubs 310 are cylindrical. The hubs 310 are configured to be rotatably coupled to the plug housing 150, such as at the sides 170, 172. Optionally, each hub 310 includes a hub seal 312 configured to be sealed between the hub 310 and the plug housing 150.

In an exemplary embodiment, the lever 300 includes a drive tool 320 at the inner end of the hub 310. The drive tool 320 is configured to interface with the corresponding connecting bolt 400 (FIG. 6) to actuate the connecting bolt 400. For example, the drive tool 320 may rotate the connecting bolt 400 when the lever 300 is rotated relative to the plug housing 150. The drive tool 320 is used to tighten the connecting bolt 400 when the lever 300 is rotated. In an exemplary embodiment, the drive tool 320 Includes drive walls 322 and a drive pocket 324 between the drive walls 322. A portion of the connecting bolt 400 is configured to be received in the drive pocket 324 between the drive walls 322. The drive walls 322 are configured to engage the connecting bolt 400 to rotate the connecting bolt 400 when the lever 300 is rotated. In the illustrated embodiment, a gap 326 is located between the drive walls 322. The gap 326 is located at the bottom of the drive pocket 324. The connecting bolt 400 is configured to be loaded into the drive pocket 324 through the gap 326 when the plug connector 100 is mated with the header connector 200.

FIG. 4 is an exploded view of a portion of the plug connector 100 in accordance with an exemplary embodiment. FIG. 4 shows the lever 300 coupled to the plug housing 150 and positioned in an unlocked position. The lever 300 may be rotated (for example approximately) 90° to a locked position (FIG. 5). FIG. 4 shows the plug terminals 110 terminated to ends of the power cables 102 and poised for loading into the plug housing 150. In the illustrated embodiment, a pair of the plug terminals 110 and a pair of the power cables 102 are provided. However, greater or fewer plug terminals 110 and power cables 102 may be provided in alternative embodiments. In an exemplary embodiment, the plug terminals 110 are welded to the ends of the power cables 102. However, the plug terminals 110 may be terminated to the power cables 102 by other means in alternative embodiments.

In an exemplary embodiment, a shield 104 is provided at the end of each power cable 102. The shield 104 is configured to be plugged into the cavity 154 of the plug housing 150. The shield 104 may be electrically connected to a plug shield (not shown) of the plug connector 100 the shield 104 provide shielding at the termination of the plug terminal 110 to the power cable 102.

In an exemplary embodiment, a seal 106 is provided at the end of the power cable 102. The seal 106 is configured to be sealed to the power cable 102 and the plug housing 150. The seal 106 provides a sealed interface at the cable end 158 of the plug housing 150, such as to seal the cavity 154 from moisture and/or debris.

In an exemplary embodiment, a cable ferrule 108 is provided at the end of the power cable 102. The cable ferrule 108 is configured to be plugged into the cable end 158 of the plug housing 150, such as at the opening 176. The cable ferrule 108 is used to secure the power cable 102 to the plug housing 150. Optionally, the cable ferrule 108 may include latches to latchably couple to the plug housing 150. The cable ferrule 108 provides strain relief for the power cable 102. In an exemplary embodiment, the cable ferrule 108 holds the seal 106. For example, the seal 106 is sealed between the cable ferrule 108 and the plug housing 150. A separate cable seal may be provided between the cable ferrule 108 and the outer jacket of the power cable 102. In various embodiments, a single cable ferrule 108 is provided holding the pair of the power cables 102. However, in alternative embodiments, individual cable ferrules 108 are provided holding corresponding individual power cables 102.

The plug terminal 110 is manufactured from a conductive material, such as a copper or aluminum material. The plug terminal 110 may be a stamped and formed component. In an exemplary embodiment, the plug terminal 110 is a blade terminal. For example, the plug terminal 110 may be a planar piece of metal. The plug terminal 110 is configured to be plugged into the header connector 200 during mating there with.

The plug terminal 110 extends between a mating end 112 and a terminating end 114. The power cable 102 is terminated to the plug terminal 110 at the terminating end 114. For example, the center conductor of the power cable 102 may be welded to the plug terminal 110 at the terminating end 114. In various embodiments, the plug terminal 110 includes a weld pad at the terminating end 114. However, the plug terminal 110 may include a crimp barrel or other type of termination in alternative embodiments.

In an exemplary embodiment, the plug terminal 110 includes a bolt hole 116 at the mating end 112. The bolt hole 116 is configured to receive the connecting bolt 400 (FIG. 6) to create a bolted electrical connection with the header terminal 210 (FIG. 6). The plug terminal 110 extends between a top edge 120 and a bottom edge 122. The plug terminal 110 includes a front edge 124 between the top edge 120 and the bottom edge 122. The plug terminal 110 includes opposite sides 126, 128 between the top edge 120 and the bottom edge 122. The conductor of the power cable 102 may be welded to one of the sides 126 or 128. In the illustrated embodiment, the first side 126 of one of the plug terminals 110 faces the second side 128 of the other plug terminal 110. In the illustrated embodiment, the bolt hole 116 is open at the bottom edge 122. For example, the bolt hole 116 is an open sided bolt hole. The connecting bolt 400 is configured to be received in the bolt hole 116 through the bottom edge 122.

FIG. 5 is a bottom perspective view of the plug connector 100 in accordance with an exemplary embodiment. FIG. 5 shows the lever 300 coupled to the plug housing 150 and positioned in a locked position. FIG. 5 shows the power cables 102 and cable ferrule 108 coupled to the cable end 158 of the plug housing 150.

The plug housing 150 includes the opening 174 at the bottom 162 of the plug housing 150 at the mating end 156. The mating end 156 is configured to be mated with the header connector 200 such that a portion of the header connector 200 is loaded into the cavity 154 through the opening 174. In an exemplary embodiment, the plug housing 150 includes guide features 180 to guide mating with the header connector 200. In the illustrated embodiment, the guide features 180 are slots or grooves at the mating end 156 that receive tabs or posts of the header connector 200 to guide mating of the plug connector 100 with the header connector 200.

In an exemplary embodiment, the plug housing 150 is a multipiece housing. For example, the plug housing 150 includes an inner housing 182 and an outer shell 184 surrounding the inner housing 182. The inner housing 182 holds the plug terminals 110. In an exemplary embodiment, a gap 186 is provided between the inner housing 182 and the outer shell 184 at the mating end 156. The gap 186 receives a portion of the header connector 200. In an exemplary embodiment, the inner housing 182 includes an opening 188 that receives a portion of the header connector 200. For example, the header terminals 210 are loaded into the opening 188 to mate with the plug terminals 110.

In an exemplary embodiment, the plug connector 100 includes a shield held by the plug housing 150. The shield 190 provides shielding around the mating interface. The shield 190 may be electrically connected to the shield 104 of the power cable 102. The shield 190 is configured to be mated to a shield of the header connector 200. In the illustrated embodiment, the shield 190 is coupled to the inner housing 182 and surrounds the opening 188.

In an exemplary embodiment, the plug connector 100 includes a mating seal 192 at the mating end 156. The mating seal 192 is configured to be coupled to the header connector 20 to provide a sealed interface between the plug connector 100 and the header connector 200. In the illustrated embodiment, the mating seal 192 is located in the gap 186 between the inner housing 182 and the outer shell 184. The mating seal 192 may be sealed to the inner housing 182 and/or the outer shell 184.

Figure 7:
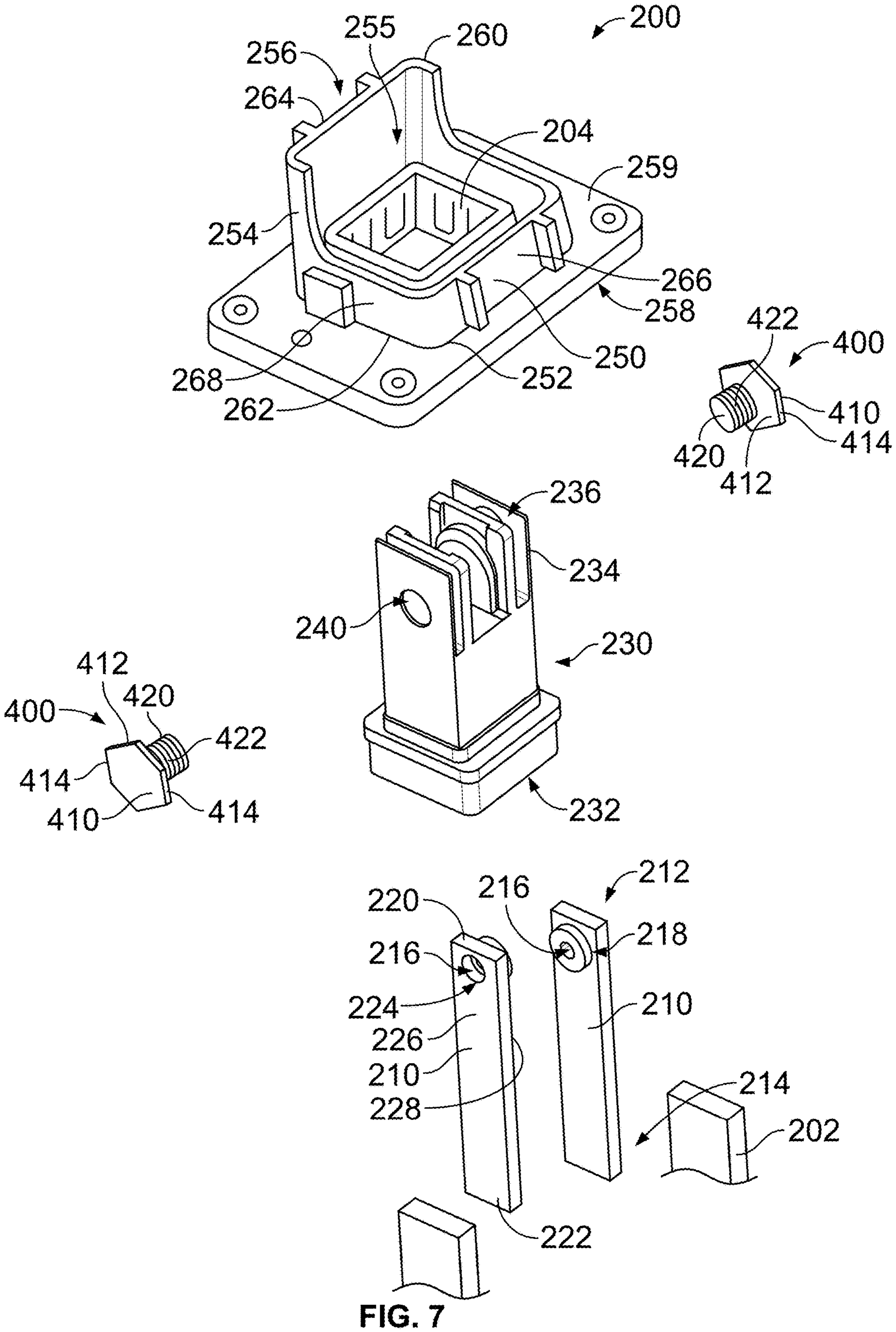
FIG. 7 is an exploded view of the header connector in accordance with an exemplary embodiment.

FIG. 6 is a top perspective view of the header connector 200 in accordance with an exemplary embodiment. FIG. 7 is an exploded view of the header connector 200 in accordance with an exemplary embodiment. The header connector 200 includes a header housing 250 used to hold the header terminals 210. In the illustrated embodiment, the header connector 200 includes a pair of the header terminals 210. However, the header connector 200 may include greater or fewer of the header terminals 210 in alternative embodiments.

In an exemplary embodiment, the header connector 200 includes a shield 204 providing shielding for the header terminals 210. The shield 204 is configured to be electrically connected to the shield 190 (FIG. 5). The shield 204 may be used to electrically common or ground the plug connector 100 to the header connector 200. The shield 204 is configured to be electrically connected to the component 14 to ground the header connector 200 to the component 14.

The header housing 250 includes a base 252 and a shroud 254 extending from the base 252. The shroud 254 surrounds a cavity 255. The shroud 254 is provided at a mating end 256 of the header housing 250. The base 252 is provided at a mounting end 258 of the header housing 250. The mating end 256 is configured to be mated with the plug connector 100. For example, the shroud 254 may be plugged into the plug housing 150 of the plug connector 100 (for example, into the gap 186). The header terminals 210 are provided at the mating end 256 for mating with the plug terminals 110. The mounting end 258 is configured to be mounted to the component 14. In an exemplary embodiment, the base 252 includes a mounting flange 259 at the mounting end 258. The mounting flange 259 may be secured to the component 14, such as using fasteners.

In an exemplary embodiment, the header housing 250 extends between a top 260 and a bottom 262. The header housing 250 includes a front 264 and a rear 266. The header housing 250 includes sides 268 extending between the front 264 and the rear 266. In the illustrated embodiment, the mating end 256 is provided at the top 260 and the mounting end 258 is provided at the bottom 262. Other orientations are possible in alternative embodiments. The shroud 254 includes corresponding shroud walls at the front 264, the rear 266, and the sides 268. Optionally, the front shroud walls may be taller than the rear shroud wall. The shroud walls may include guide features, such as tabs extending from the shroud walls configured to be plugged into the plug connector 100 during mating to guide mating of the plug connector 100 with the header connector 200.

In an exemplary embodiment, the header connector 200 includes a terminal holder 230 configured to hold the header terminals 210. The terminal holder 230 is configured be plugged into the header housing 250, such as through the bottom 262. The terminal holder 230 may be positioned in the cavity 255 and surrounded by the shroud 254. The terminal holder 230 includes terminal channels 232 that receive the corresponding header terminals 210. The terminal holder 230 includes towers 234 at the top of the terminal holder 230 that surround the terminal channels 232 and the header terminals 210 received in the terminal channels 232. In an exemplary embodiment, the towers 234 have slots 236 opened to the terminal channels 232. The slots 236 are open at the top and/or the front and/or the rear of the towers 234. The slots 236 are configured to receive the plug terminals 110 during mating. In an exemplary embodiment, the towers 234 includes pockets 238 at sides of the towers 234. The pockets 238 are open to the terminal channels 232. The pockets 238 may receive portions of the connecting bolts 400. The pockets 238 may receive threaded inserts or knots configured to be coupled to the threaded bolts 400. In an exemplary embodiment, the towers 234 include openings 240 configured to receive the threaded bolts 400.

The header terminal 210 is manufactured from a conductive material, such as a copper or aluminum material. The header terminal 210 may be a stamped and formed component. In an exemplary embodiment, the header terminal 210 is a blade terminal. For example, the header terminal 210 may be a planar piece of metal.

The header terminal 210 extends between a mating end 212 and a terminating end 214. The mating end 212 of the header terminal is configured to be received in the terminal channel 232 of the terminal holder. The terminating end 214 may extend from the terminal holder 230, such as below the terminal holder 230. The bus bar 202 (FIGS. 1 and 2) is terminated to the header terminal 210 at the terminating end 214. For example, the bus bar 202 may be welded or bolted to the terminating end 214.

In an exemplary embodiment, the header terminal 210 includes a threaded portion 216 at the mating end 212. The threaded portion 216 is configured to receive the connecting bolt 400. In an exemplary embodiment, the threaded portion 216 includes a threaded insert 218 received in the header terminal 210 having a threaded bore configured to receive the connecting bolt 400. The threaded portion 216 is configured to be located in the pocket 238 of the terminal holder 230. The threaded portion 216 is positioned in the terminal holder 230 such that the threaded bore is aligned with the opening 240 in the terminal holder 230 to receive the connecting bolt 400. The threaded insert 218 may be pressed into an opening in the header terminal 210. The threaded insert 218 may be welded to the header terminal 210. In alternative embodiments, the threaded portion 216 includes threads formed directly on the header terminal 210, such as in an opening passing through the header terminal 210.

The header terminal 210 extends between a top 220 and a bottom 222. The header terminal 210 includes an opening 224 located between the top 220 and the bottom 222. The threaded portion 216 is provided at the opening 224. For example, the threaded insert 218 is received in the opening 224. The header terminal 210 includes opposite sides 226, 228 between the top 220 and the bottom 222. In an exemplary embodiment, the first side 226 is configured to face the plug terminal 110 and defines a mating interface of the header terminal 210. The threaded portion 216 may extend from the first side 226 and/or the second side 228.

In an exemplary embodiment, the header connector 200 includes a pair of the connecting bolts 400 associated with the corresponding header terminals 210. Greater or fewer connecting bolts 400 may be provided in alternative embodiments. Each connecting bolt 400 includes a head 410 and a shaft 420 extending from the head 410. The shaft 420 is a threaded shaft having threads 422. The threads 422 are configured to be threadably coupled to the threaded portion 216 of the corresponding header terminal 210. For example, the connecting bolt 400 may be tightened or loosened by rotating the connecting bolt 400 relative to the threaded portion 216. The shaft 420 is configured to be loaded into the opening 240 of the terminal holder 230 for receipt in the threaded portion 216 after the header terminal 210 is loaded into the terminal channel 232. For example, the connecting bolts 400 may be loaded into the openings 240 from the opposite, exterior sides of the towers 234 such that the heads 410 are located at the exterior sides of the towers 234 to interface with the lever 300 (FIG. 3).

The head 410 includes an interior surface 412 that faces the terminal holder 230. The interior surface 412 may abut against the sides of the terminal holder 230 to position the connecting bolt 400 relative to the terminal holder 230. The head 410 includes drive elements 414 for driving (for example, rotating) the connecting bolt 400. In the illustrated embodiment, the drive elements 414 are outer edges of the head 410. The drive element 414 are configured to interface with the drive tool 320 (FIG. 3) of the lever 300 to rotate the connecting bolt 400 when the lever 300 is moved between the unlocked position and the locked position. In the illustrated embodiment, the head 410 is hexagonal shaped having six drive elements 414. Other types of drive elements may be used in alternative embodiments, such as a slot or opening to receive a different shaped drive tool.

Figure 8:
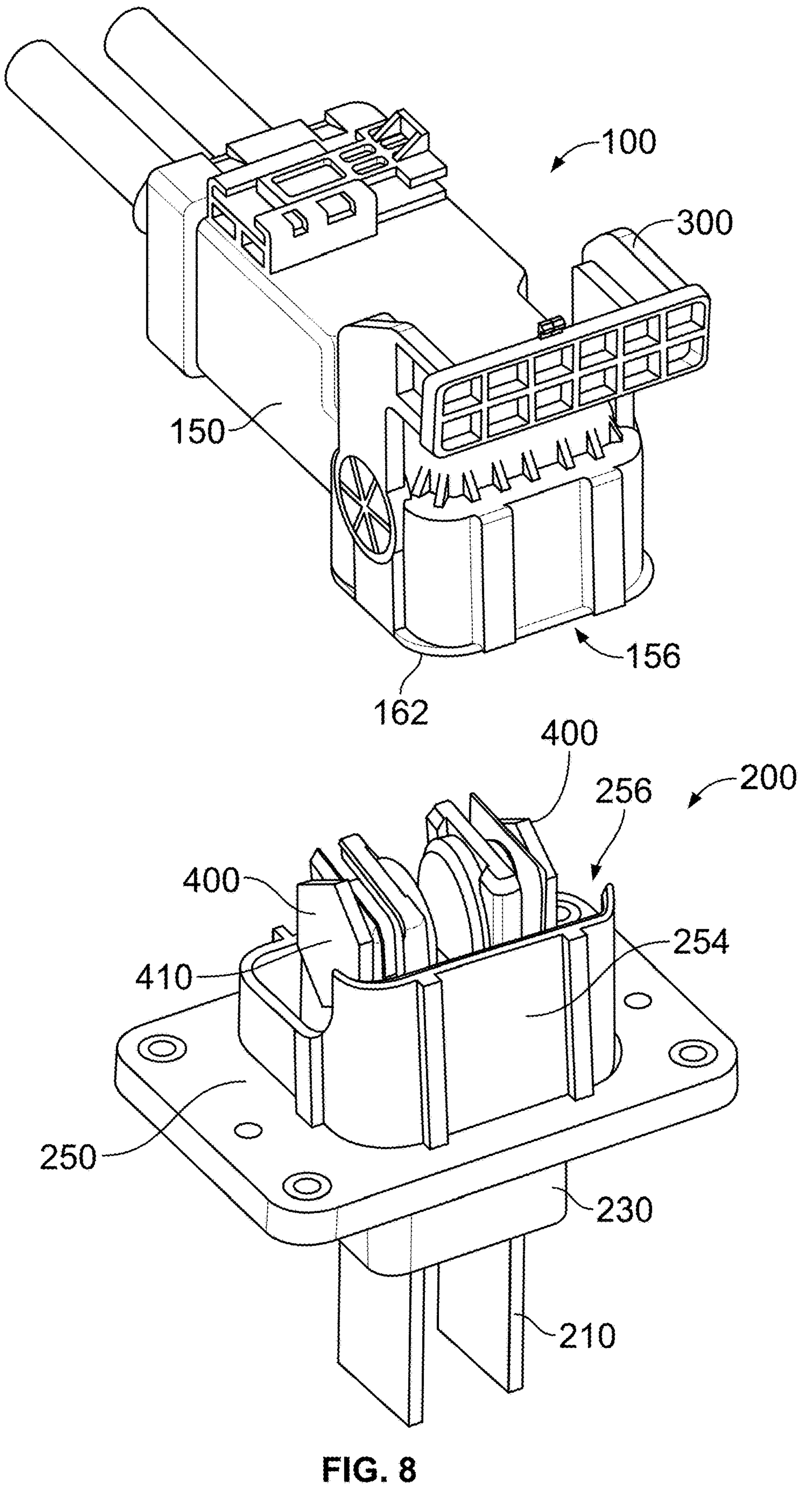
FIG. 8 is a front perspective view of the power connector system showing the plug connector poised for mating with the header connector in accordance with an exemplary embodiment.

FIG. 8 is a front perspective view of the power connector system 10 showing the plug connector 100 poised for mating with the header connector 200. The plug connector 100 is mated with the header connector 200 and a mating direction, shown by the arrow. The mating end 156 of the plug housing 150 is aligned with the mating end 256 of the header housing 250. When mated, the shroud 254 is received in the opening 174 at the bottom 162 of the plug housing 150. The terminal holder 230 and the header terminals 210 are received in the plug connector 100 to mate the header terminals 210 with the plug terminals 110. In an exemplary embodiment, the connecting bolts 400 are used to create a bolted connection between the header terminals 210 and the plug terminals 110. For example, the connecting bolts 400 are tightened after the plug terminals 110 are received in the slots 236 of the terminal holder 230 to create a bolted, compression connection between the header terminals 210 and the plug terminals 110. The connecting bolts 400 are tightened by rotating the connecting bolts 400. For example, the drive tools 320 of the lever 300 interface with the heads 410 of the connecting bolts 400 to rotate the connecting bolts 400 as the lever 300 is rotated from the unlocked position (FIG. 8) to the locked position.

Figure 9:
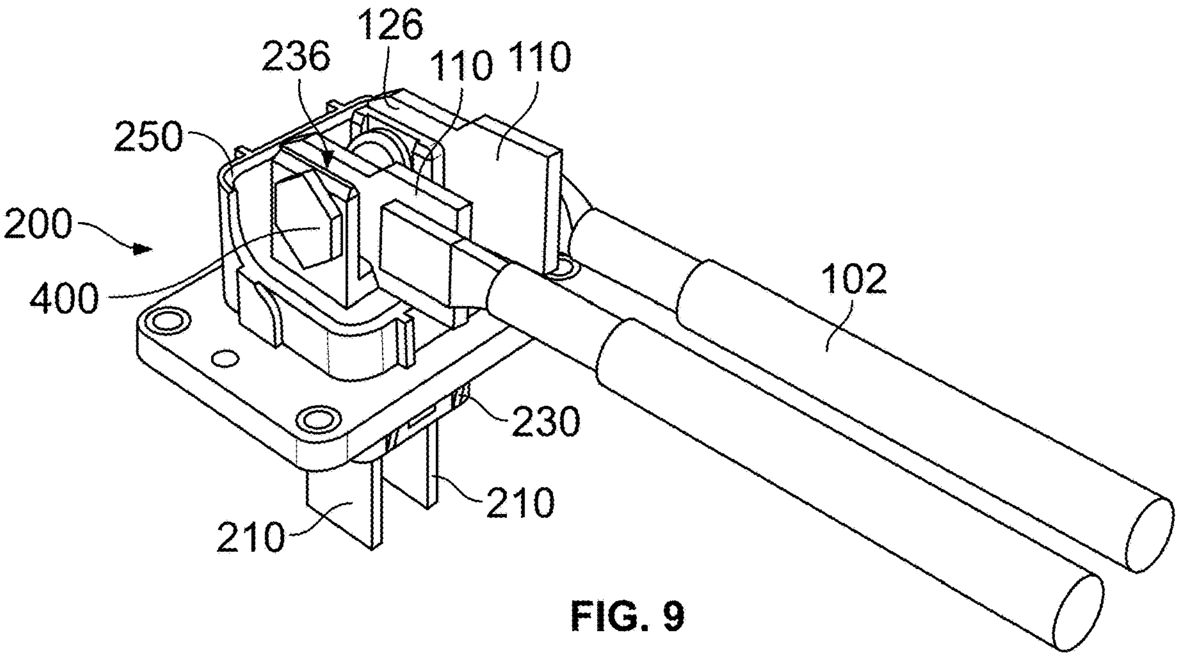
FIG. 9 is a rear perspective view of a portion of the power connector system showing the plug terminals coupled to the header terminals in accordance with an exemplary embodiment.
Figure 10:
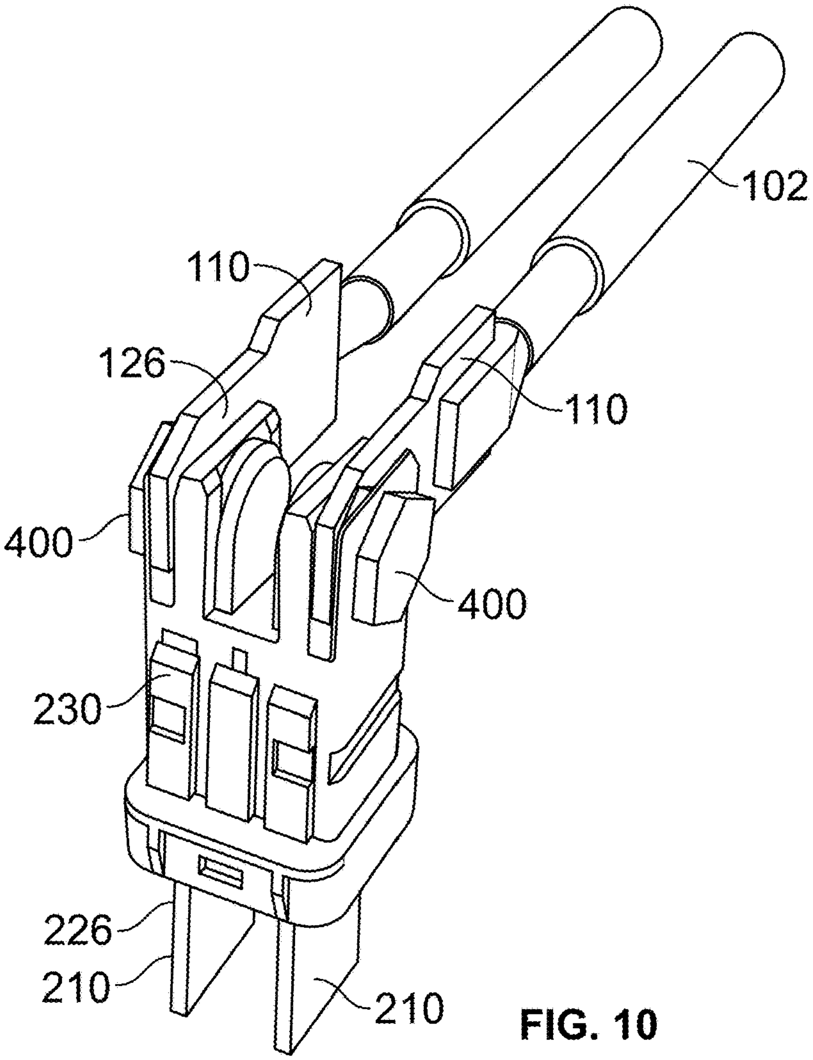
FIG. 10 is a front perspective view of a portion of the power connector system showing the plug terminals coupled to the header terminals in accordance with an exemplary embodiment.

FIG. 9 is a rear perspective view of a portion of the power connector system 10 showing the plug terminals 110 coupled to the header terminals 210. FIG. 10 is a front perspective view of a portion of the power connector system 10 showing the plug terminals 110 coupled to the header terminals 210. The plug housing 150 (FIG. 8) is removed in FIGS. 9 and 10 to illustrate the plug terminals 110 and the power cables 102 terminated to the plug terminals 110. The header housing 250 is removed in FIG. 10 to illustrate the terminal holder 230 and the header terminals 210.

During mating, the plug terminals 110 are mated to the header connector 200 in the mating direction (for example, downward). The plug terminals 110 are loaded into the slots 236 of the terminal holder 230 such that sides 126 of the plug terminals 110 face sides 226 of the header terminals 210. The bolt holes 116 (FIG. 4) are provided at the bottoms of the plug terminals 110 to receive the connecting bolts 400 when the plug terminals 110 are loaded into the slots 236. The connecting bolts 400 pass through the plug terminals 110 and are threadably coupled to the header terminals 210. When the connecting bolts 400 are tightened, the header terminals 210 are pressed into electrical contact with the plug terminals 110.

Figure 11:
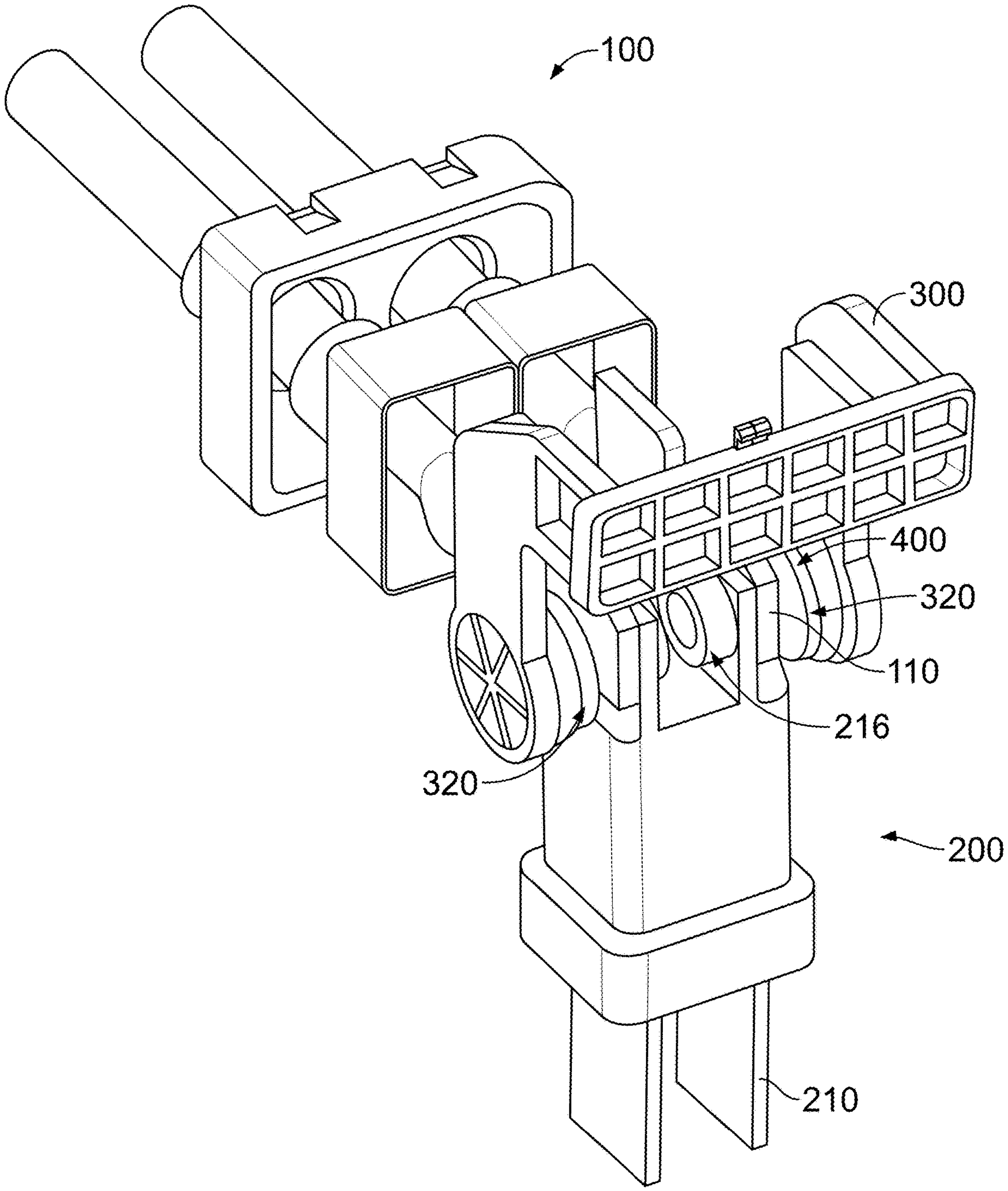
FIG. 11 is a front perspective view of a portion of the power connector system showing the lever coupled to the connecting bolts with the lever in an unlocked position in accordance with an exemplary embodiment.
Figure 12:
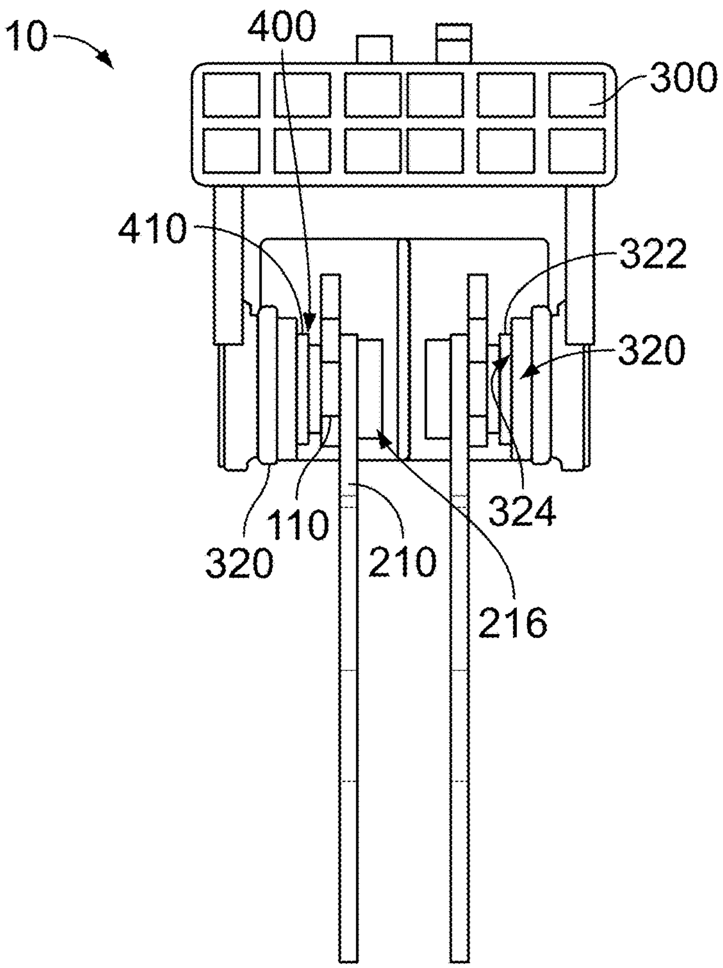
FIG. 12 is a front view of a portion of the power connector system showing the lever coupled to the connecting bolts with the lever in an unlocked position in accordance with an exemplary embodiment.
Figure 13:
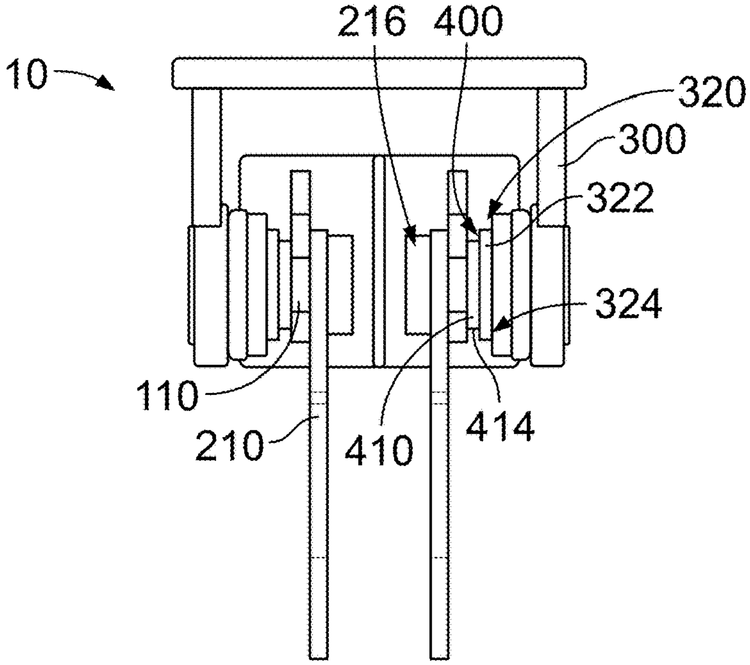
FIG. 13 is a front perspective view of a portion of the power connector system showing the lever coupled to the connecting bolts with the lever in a locked position in accordance with an exemplary embodiment.

FIG. 11 is a front perspective view of a portion of the power connector system 10 showing the lever 300 coupled to the connecting bolts 400 with the lever 300 in an unlocked position. FIG. 12 is a front view of a portion of the power connector system 10 showing the lever 300 coupled to the connecting bolts 400 with the lever 300 in an unlocked position. FIG. 13 is a front perspective view of a portion of the power connector system 10 showing the lever 300 coupled to the connecting bolts 400 with the lever 300 in a locked position. The plug terminals 110 and the header terminals 210 are shown in FIGS. 11-13; however, the plug housing 150 and the header housing 250 are removed to illustrate the internal components of the connectors 100, 200.

During mating, when the plug connector 100 is lowered onto the header connector 200, the lever 300 interfaces with the connecting bolts 400. For example, the heads 410 of the connecting bolts 400 are received in the drive pockets 324 of the corresponding drive tools 320. The drive walls 322 interface with the drive elements 414 of the connecting bolts 400. Rotation of the lever 300 from the unlocked position to the locked position causes rotation of the connecting bolts 400. Rotation of the connecting bolt 400 tightens the threaded connection between the connecting bolts 400 and the corresponding threaded portion 216, which causes the header terminal 210 and the head 410 of the connecting bolts 400 to move closer together and thus compress the header terminal 210 against the plug terminal 110 to create a reliable electrical connection.

Figure 14:
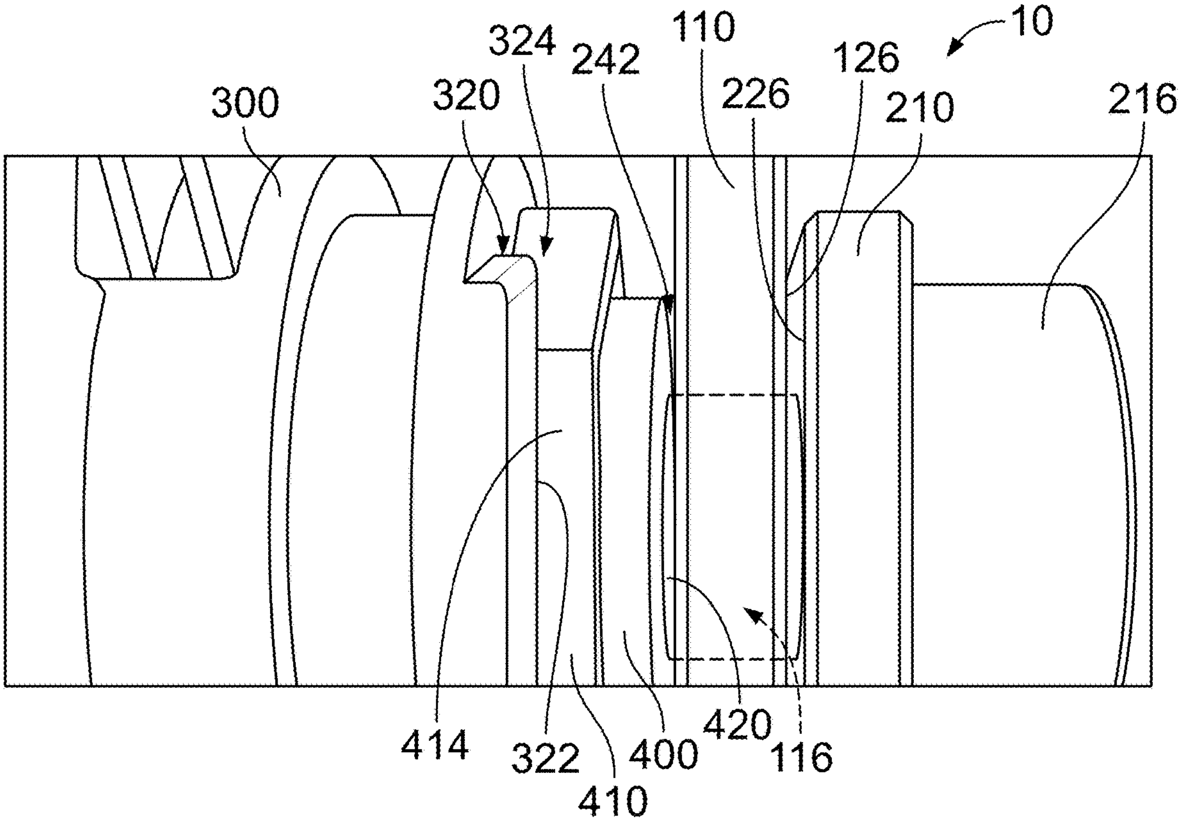
FIG. 14 is an enlarged view of the mating interface between the plug terminal and the header terminal in an uncoupled state in accordance with an exemplary embodiment.
Figure 15:
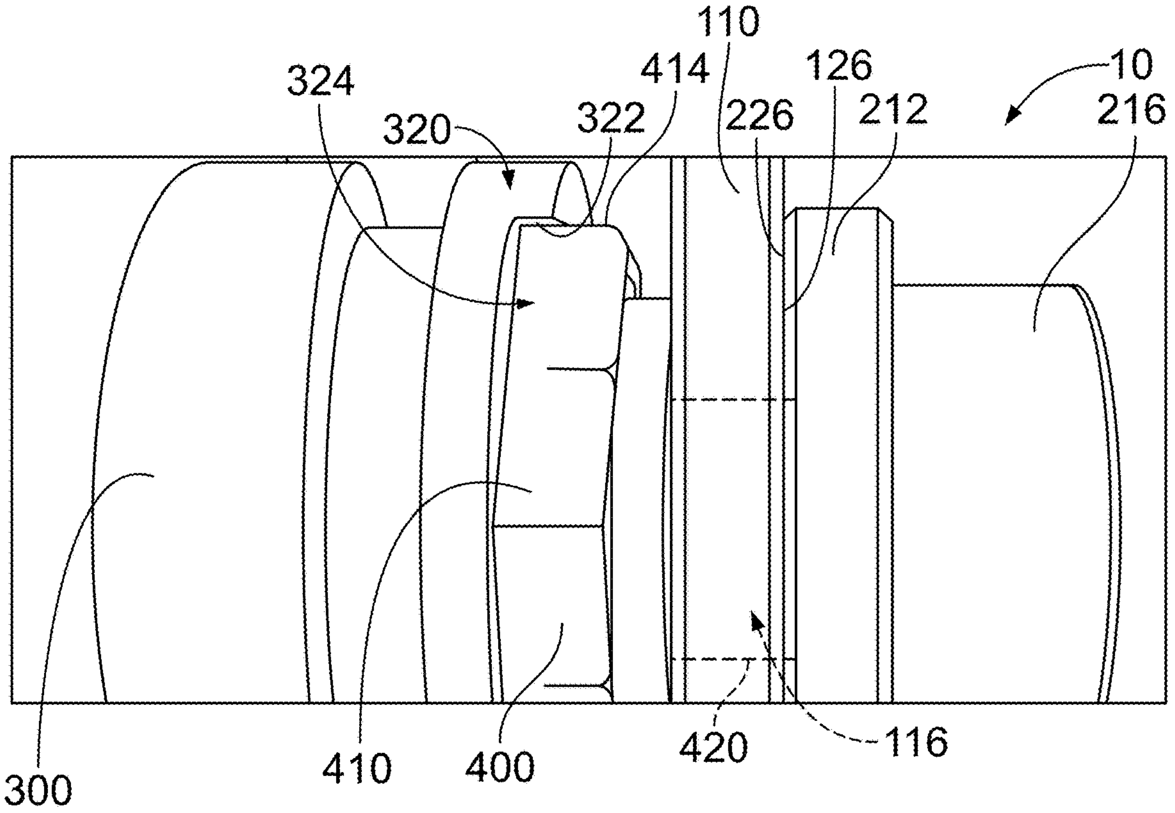
FIG. 15 is an enlarged view of the mating interface between the plug terminal and the header terminal in a coupled state in accordance with an exemplary embodiment.

FIG. 14 is an enlarged view of the mating interface between the plug terminal 110 and the header terminal 210 in an uncoupled state. FIG. 15 is an enlarged view of the mating interface between the plug terminal 110 and the header terminal 210 in a coupled state. The connecting bolt 400 is shown in a loosened state in FIG. 14 and a tightened state in FIG. 15. For example, the connecting bolt 400 is rotated between the loosened state and the tightened state by the drive tool 320 of the lever 300. When the plug connector 100 is mated with the header connector 200 the head 410 of the connecting bolt 400 is received in the drive pocket 324 of the drive tool 320. The drive walls 322 of the drive tools 320 engage the drive elements 414 of the connecting bolt 400. Rotation of the lever 300 (for example, 90° rotation) causes rotation of the connecting bolt 400 (for example, 90° rotation).

The shaft 420 of the connecting bolt 400 passes through the plug terminal 110, such as through the bolt hole 116 (FIG. 4). The shaft 420 is threadably coupled to the threaded portion 216. The plug terminal 110 is located in a gap 242 between the head 410 and the header terminal 210. In the loosened state (FIG. 14) the gap 242 has a width. When the connecting bolt 400 is rotated and tightened to the tightened state (FIG. 15, the gap 242 has a narrower width. For example, as the connecting bolt 400 is tightened, the header terminal 210 is pulled inward toward the head 410. As the header terminal 210 is pulled inward, the header terminal 210 is compressed against the plug terminal 110. For example, the sides 226 of the header terminal 210 compresses against the sides 126 of the plug terminal 110. The connecting bolt 400 holds the header terminal 210 tightly against the plug terminal 110 to create a reliable electrical connection when the connecting bolt 400 is in the tightened state. The lever 300 may be locked in the locked position to retain the connecting bolt 400 in the tightened state to maintain the reliable electrical connection between the header terminal 210 and the plug terminal 110. The header terminal 210 is held tightly against the plug terminal 110 even through vibration of the power connector system 10. The mating interface between the header terminal 210 and the plug terminal 110 is provided without spring beams. Rather a direct planar mating interface is defined between the sides 226 of the header terminal 210 and the side 126 of the plug terminal 110 allowing high current transfer between the header terminal 210 and the plug terminal 110 across the large planar surface areas of the sides 226, 126.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure

What is claimed is:

1. A power connector system comprising:

a plug connector including a plug housing holding a plug terminal, the plug housing including a mating opening at a mating end, the plug terminal having a mating end aligned with the mating opening, the plug terminal having a terminating end terminated to an end of a power cable, the power cable exiting the plug housing at a cable exit, the plug connector including a lever rotatably coupled to the plug housing;

a header connector including a header housing holding a header terminal, the header terminal being received in the mating opening to mate with the plug terminal when the plug connector is mated with the header connector, the header connector including a connecting bolt coupled to the header terminal, the connecting bolt includes a head and a threaded shaft, the header terminal being pressed into the plug terminal when the connecting bolt is tightened;

wherein the lever is actuated to tighten the connecting bolt, the lever engaging the head to rotate the connecting bolt, the threaded shaft being threadably coupled to the header terminal.

2. The power connector system of claim 1, wherein the connecting bolt creates a bolted connection between the header terminal and the plug terminal.

3. The power connector system of claim 1, wherein the connecting bolt is tightened to create a compression connection between the header terminal and the plug terminal.

4. The power connector system of claim 1, wherein the lever is movable between an unlocked position and a locked position, the lever rotating the connecting bolt when moved from the unlocked position to the locked position.

5. The power connector system of claim 1, wherein the plug terminal includes a bolt hole therethrough, the bolt hole receiving the connecting bolt.

6. The power connector system of claim 1, wherein the head is separated from the header terminal by a gap, the plug terminal received in the gap, a width of the gap being narrowed when the connecting bolt is tightened.

7. The power connector system of claim 1, wherein the connecting bolt pulls the header terminal toward the head when the connecting bolt is tightened to press a mating surface of the header terminal into a mating surface of the plug terminal.

8. The power connector system of claim 1, wherein the header terminal includes a first side and a second side, the plug terminal including a first side and a second side, the first side of the header terminal facing the first side of the plug terminal, the first side of the header terminal pressing against the first side of the plug terminal when the connecting bolt is tightened to electrically connect the header terminal and the plug terminal.

9. The power connector system of claim 1, wherein the lever includes a drive tool, the drive tool engaging the connecting bolt to rotate the connecting bolt when the lever is moved between an unlatched position and a latched position.

10. The power connector system of claim 1, wherein the plug connector includes a second plug terminal, the header connector including a second header terminal and a second connecting bolt coupled to the second header terminal, the lever engaging the connecting bolt and the second connecting bolt to tighten the connecting bolt and the second connecting bolt when the lever is rotated from an unlocked position to a locked position, the second header terminal being pressed into the second plug terminal when the second connecting bolt is tightened.

11. The power connector system of claim 1, wherein the plug terminal includes a bolt hole open at a bottom edge of the plug terminal, the bolt hole receiving the connecting bolt through the open bottom edge when the plug connector is mated with the header connector.

12. The power connector system of claim 1, wherein the header terminal and the plug terminal are shifted relatively closer when the connecting bolt is tightened.

13. The power connector system of claim 1, wherein the connecting bolt is completely enclosed by the plug housing and the header housing.

14. The power connector system of claim 1, wherein the lever extends into the header housing to interface with the connecting bolt.

15. A power connector system comprising:

a plug housing having a cavity extending between a mating end and a cable end, the plug housing having a mating opening at the mating end configured to receive a portion of a header housing when mated thereto;

a plug terminal received in the cavity, the plug terminal having a terminating end, the plug terminal having a mating end aligned with the mating opening, the plug terminal including a mating surface configured to be mated with a header terminal, the mating end including a bolt hole configured to receive a connecting bolt of the header housing;

a power cable coupled to the terminating end of the plug terminal, the power cable exiting the plug housing at the cable end;

a lever rotatably coupled to the plug housing and movable between an unlocked position and a locked position, the lever including a drive tool configured to engage the connecting bolt to drive the connecting bolt when the lever is rotated, wherein the plug terminal is uncoupled from the header terminal when the lever is in the unlocked position and wherein the plug terminal is coupled to the header terminal when the lever is in the locked position.

16. The power connector system of claim 15, wherein the bolt hole is open at a bottom edge of the plug terminal, the bolt hole configured to receive the connecting bolt through the open bottom edge when the plug connector is mated with the header connector.

17. The power connector system of claim 15, wherein the lever includes a hub configured to extend into the header housing to interface with the connecting bolt.

18. A power connector system comprising:

a header housing having a base and a shroud extending from the base, the shroud surrounding a cavity, the shroud configured to be plugged into a mating opening of a plug housing of a plug connector, the base including a mounting flange configured to be mounted to a component;

a header terminal received in the cavity, the header terminal having a mating end including a mating surface configured to be mated with a plug terminal, the header terminal including a threaded bore at the mating end;

a connecting bolt threadably coupled to the header terminal at the threaded bore, the connecting bolt including a head configured to engage a locking lever of the plug connector, the head configured to be rotated relative to the header terminal as the locking lever is moved from an unlocked position to the locked position;

wherein the header terminal is moved relative to the head when the head is rotated to couple the header terminal to the plug terminal when the head is rotated.

19. The power connector system of claim 18, wherein the head is separated from the header terminal by a gap configured to receive the plug terminal, a width of the gap being narrowed when the connecting bolt is tightened.

* * * * *